Dec. 14, 1954 P. W. HARLAND 2,697,147
SIGNAL TRANSMITTING DEVICE
Filed Jan. 9, 1952
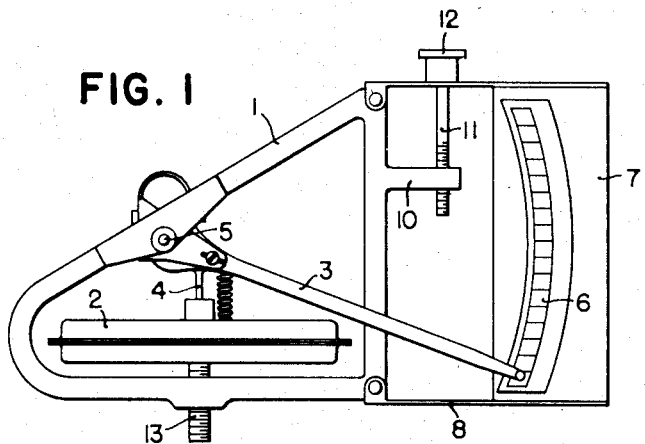
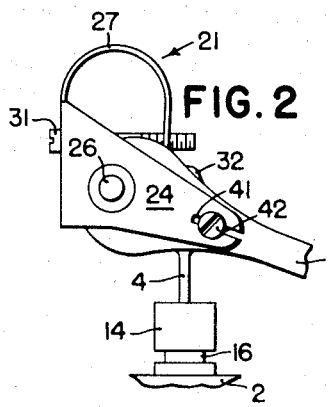
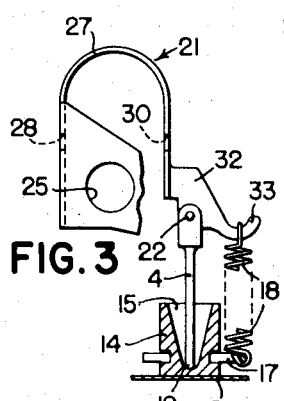
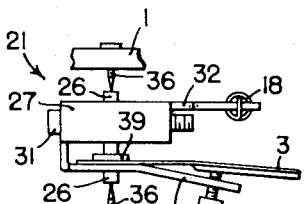
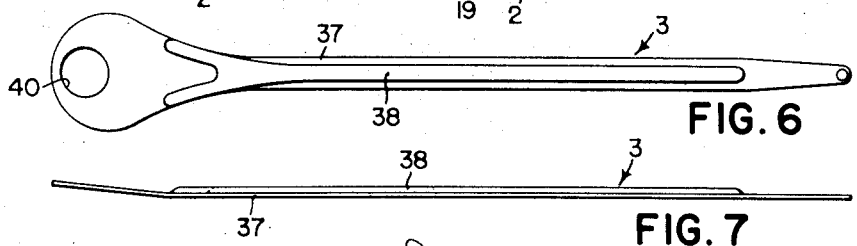
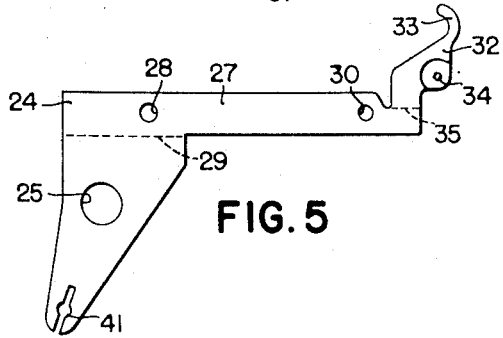
INVENTOR.
PHILIP W. HARLAND
BY
ATTORNEY

United States Patent Office 2,697,147
Patented Dec. 14, 1954

2,697,147

SIGNAL TRANSMITTING DEVICE

Philip W. Harland, Sellersville, Pa., assignor to American Machine and Metals, Inc., New York, N. Y., a corporation of Delaware Application January 9, 1952, Serial No. 265,685

6 Claims. (Cl. 200—83)

The invention relates to an improvement in a contact arm actuated by a diaphragm responding to pressure changes to close various circuits as the diaphragm expands or contracts.

The invention relates especially to a very light weight unit, accurate despite the vibrations incident to its being carried on a flexible balloon, whose accuracy is not effected by sharp temperature changes.

The device has particular application in radiometeorography where a balloon inflated with helium is released and provided with sending devices such as shown in Patent 2,283,919 granted H. Diamond May 26, 1942. In such devices a sealed evacuated diaphragm capsule is distorted by the external atmospheric pressure. As the balloon rises the pressure of the surrounding atmosphere decreases, the diaphragm expands and moves the contact arm over an arc, successively making contact with a number of bars, each of which forms a part of a circuit that will relay back to the earth the elevation of the balloon, the temperature at that elevation, the moisture, and any other information that may be desired.

As the balloon rises into higher levels, the pressure is so low that a very small pressure change represents a very large difference in elevation. As the height to which such exploration is carried has been increased from 50,000 ft. to 150,000 ft., a greater accuracy is demanded. This requires minimizing the effects of gravity, friction and temperature. It also requires making the parts as light as possible.

Fig. 1 shows in elevation the contact arm actuated by an evacuated capsule.

Fig. 2 is a portion of the structure shown in Figure 1 drawn to an enlarged scale.

Fig. 3 is the same as Fig. 2 except that some parts have been broken away.

Fig. 4 is a top view of the parts shown in Fig. 2.

Fig. 5 is a developed blank of one of the pieces.

Fig. 6 is a plan of the contact arm.

Fig. 7 is an elevation of the contact arm.

1 indicates a frame carried on a balloon. This frame supports an evacuated capsule 2 and a contact arm 3 actuated by the capsule through the rod 4. The contact arm swings about pivot point 5 on the frame and its end makes contact with metallic strips 6. Each of these strips is connected with the sending apparatus not shown to send a signal in the manner described in Patent 2,283,919. The metallic strips 6 are imbedded in a block 7 which is mounted on springs 8. The frame has a projection 10 and a screw 11 which may be turned by the knob 12 which bears upon one of the springs 8 may be used to adjust the vertical position of the contact arm relative to the slider arm.

The evacuated diaphragm is supported on a brass threaded stud 13 set in the frame 1. Brass has been selected because it has been found that more rapid expansion offsets the effect of temperature upon the diaphragm 2 which is made of Ni-Span-C, an alloy of nickel-iron-chromium-titanium. This has a very low temperature coefficient.

In order to transmit the movement of the diaphragm to the arm 3 with a minimum of friction and with means for adjusting and correcting for temperature, a special lever 21 shown in Figs. 2, 3, 4 and 5 is provided. This lever 21 is preferably made of a single stamping 24 shown in Fig. 5. This stamping is bent at right angles along lines 29 and 35 and a portion 27 is formed into a semi-circle so that the single stamping shown in Fig. 5 finally takes the form shown in Figs. 2, 3 and 4.

The blank is provided with a hole 25 and a shaft 26 having a shoulder 39 passes through this hole and is fused or otherwise attached to the blank. The ends of this shaft are bored to adapt it to be supported on pivots 36 in the frame 1. The strip 27 which is bent into a U shape has two holes 28 and 30, the latter threaded. A headed screw 31 passes through these two holes. The end 32 of the strip has a notch 33 and a hole 34.

It will be noted that the single piece shown in Fig. 5, together with the screw 31, has been converted into a lever, one of whose arms may be changed in length by turning the screw 31. Here also the screw 31 may be made of such a material that under sudden temperature changes the change in length of the screw will offset the change in size of other parts.

In order to transmit the movement of the diaphragm to this assembly, a rod 4 having a pointed end 19 is pivoted on the pin 22 which passes through the hole 34. The diaphragm capsule carries a boss 14 having a conical hole 15 into which the rod 4 extends. In order to transmit the movement without friction the rod 4 is held in constant contact with the boss 14 by the spring 18 the end of which is hooked over the notch 33. The other end of the spring may be attached to a plate 17 which fits into a groove 16 in the piece 14.

Since the shaft 26 is supported in the frame 1 on pivots 36 as shown in Fig. 4, it will be obvious that the vertical movement of the diaphragm will transmit movement through the rod 4, pin 22, to the part 32 and cause the entire piece 21 to swing about the pivots 36.

The contact arm 3 shown in Figs. 6 and 7 is made of a light spring bronze strip 37, a ridge 38 stamped into the blank to make the arm stiffer. The hole 40 permits sliding the piece onto shaft 26 as shown in Fig. 4 so that it will be held between the flange 39 and the bent piece 24. The end of this arm makes contact with the metallic strips 6. In order to adjust the pressure of this arm against the strips so as to secure a positive contact and yet to reduce the load upon the diaphragm, a screw 42 is provided which fits into the threaded hole 41 through which a slot passes. In this manner the screw will remain in its adjusted position. The end of the screw bears against the contact arm 3 depressing it to the extent desired.

What I claim:

1. In a signal transmitting device, the combination including a frame, an aneroid diaphragm capsule supported on the frame, shaft means pivoted in said frame, an integral formed sheet member having a flat portion adapted to be attached normal to said shaft and a second portion bent at right angles to said flat portion and having an extension curved into a shape having a free end spaced from said second portion and adjustably movable relative thereto, a rod pivotally mounted on said free end portion and having an end bearing against said capsule, a series of contacts carried by said frame, and a contact arm attached to the flat portion of said formed sheet member which moves over said contacts as the ambient pressure changes.

2. In a signal transmitting device, the combination including a frame, an aneroid diaphragm capsule supported on the frame, a single shaft pivoted in said frame, a formed sheet member having a flat portion adapted to be attached normal to said shaft and another portion bent at right angles thereto and having an extending portion curved into a U shape, a rod having a pivoted connection to the free end of said U-shaped portion, said connection being spaced from said shaft, said rod bearing against said capsule, an adjustment screw adjustable to draw the legs of said U together so as to change the distance between said shaft and pivoted connection, a series of contacts carried by said frame, and a contact arm attached to the flat portion of said stamping which moves over said contacts as the ambient pressure changes.

3. In a signal transmitting device, the combination including a frame, an aneroid diaphragm capsule supported on the frame, a single shaft pivoted in said frame, a formed sheet metal member having a triangular flat portion adapted to be attached normal to said shaft and another portion bent at right angles thereto having a portion extending therefrom curved into a U shape, a rod having a pivoted connection to the free end of said U-shaped portion; said rod bearing against said capsule, said connection being adjustably spaced from said shaft, an adjustment screw adapted to draw the legs of said U together to change the spacing between the connection and shaft, a series of contacts carried by said frame, a contact arm whose end is attached to the flat portion of said stamping which moves over said contacts as the ambient pressure changes, and a screw carried by the apex of said triangular flat portion bearing against said contact arm to vary the pressure of the arm against the contacts.

4. In a signal transmitting device, the combination including a frame, an aneroid diaphragm capsule supported on the frame, a single shaft pivoted in said frame, a formed sheet having a triangular flat portion adapted to be attached normal to said shaft and another portion extending therefrom and bent at right angles thereto, said latter portion being curved into a U shape, and a third portion bent at right angles to the free end of said U shape so as to be parallel to said triangular portion, a rod pivoted to said third portion bearing against said capsule, an adjustment screw adapted to draw the legs of said U together and thus change the distance between said rod and said shaft, a series of contacts carried by said frame, a contact arm whose end is attached to the flat portion of said formed sheet which moves over said contacts as the ambient pressure changes, and a screw carried by the apex of said triangular flat portion bearing against said contact arm to vary the pressure of the arm against the contacts.

5. In a signal transmitting device, the combination including a frame, an aneroid diaphragm capsule supported on the frame, a stud attached to the center of one face of said capsule having a tapered axial hole, a single shaft pivoted in said frame, an integral sheet member having a triangular flat portion adapted to be attached normal to said shaft and another portion bent at right angles thereto, said latter portion extending into a curved U shape, and a third portion bent at right angles to the free end of said U shape so as to be parallel to said triangular portion, a rod having a pivoted connection to said third portion, said rod having an end bearing against the bottom of said tapered hole in the stud attached to said capsule, an adjustment screw adapted to draw the legs of said U together so as to change the spacing of said shaft and pivoted connection, a series of contacts carried by said frame, a contact arm whose end is attached to the flat portion of said stamping which moves over said contacts as the ambient pressure changes, and a screw carried by the apex of said triangular flat portion bearing against said contact arm to vary the pressure of the arm against the contacts.

6. In a signal transmitting device having an aneroid diaphragm capsule moving an arm over spaced contacts, means to adjust the movement of the arm to the spacing of the contacts and to zeroize it, the combination including a frame, a contact panel movably supported by said frame, a series of contacts spaced along said panel, an aneroid diaphragm capsule supported on the frame, a single shaft pivoted in said frame, a single formed sheet member having a triangular flat portion adapted to be attached normal to said shaft and another portion bent at right angles thereto with an extending strip curved into a U shape with a free end, and a third portion bent at right angles to said free end of said U shape so as to be parallel to said triangular portion, a rod having a pivoted connection to said third portion at a position spaced from said shaft, said rod having an end bearing against said capsule, an adjustment screw adapted to draw the legs of said U together to change the spacing of said pivoted connection and shaft to adjust movement of the contact arm relative to the contacts, a contact arm whose end is attached to the flat portion of said stamping which moves over said contacts as the ambient pressure changes, and means for adjusting the position of the panel on the frame.

References Cited in the file of this patent

UNITED STATES PATENTS

| Number | Name | Date |
|---|---|---|
| 1,874,704 | Johnson | Aug. 30, 1932 |
| 2,315,137 | Shaw | Mar. 30, 1943 |
| 2,319,011 | Meredith | May 11, 1943 |
| 2,322,229 | Diamond et al. | June 22, 1943 |
| 2,437,473 | Ogden | Mar. 9, 1948 |